US012739950B2

(12) United States Patent
Wang et al.

(10) Patent No.: US 12,739,950 B2
(45) Date of Patent: Sep. 15, 2026

(54) HEATING APPARATUS

(71) Applicants: QINGDAO HAIER SPECIAL REFRIGERATION ELECTRIC APPLIANCE CO., LTD., Qingdao (CN); HAIER SMART HOME CO., LTD., Qingdao (CN)

(72) Inventors: Haijuan Wang, Qingdao (CN); Peng Li, Qingdao (CN); Zhiqiang Han, Qingdao (CN); Chunyang Li, Qingdao (CN); Ming Wang, Qingdao (CN)

(73) Assignees: QINGDAO HAIER SPECIAL REFRIGERATION ELECTRIC APPLIANCE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 820 days.

(21) Appl. No.: 18/021,007

(22) PCT Filed: Oct. 20, 2021

(86) PCT No.: PCT/CN2021/124863
§ 371 (c)(1),
(2) Date: Feb. 13, 2023

(87) PCT Pub. No.: WO2022/037724
PCT Pub. Date: Feb. 24, 2022

(65) Prior Publication Data

US 2023/0300957 A1 Sep. 21, 2023

(30) Foreign Application Priority Data

Aug. 20, 2020 (CN) ........................ 202021750769.2

(51) Int. Cl.
*H05B 6/76* (2006.01)
*H05B 6/64* (2006.01)

(52) U.S. Cl.
CPC .......... *H05B 6/763* (2013.01); *H05B 6/6417* (2013.01)

(58) Field of Classification Search
CPC .......... A23B 2/82; H05B 6/64; H05B 6/6414; H05B 6/6417; H05B 6/76; H05B 6/763; Y02P 60/85
See application file for complete search history.

(56) References Cited

FOREIGN PATENT DOCUMENTS

| | | |
|---|---|---|
| CN | 104298325 A | 1/2015 |
| CN | 209893778 U | 1/2020 |

(Continued)

OTHER PUBLICATIONS

Chinese Intellectual Property Office (ISR/CN), "International Search Report for PCT/CN2021/124863", China, Jan. 24, 2022.

*Primary Examiner* — Hung D Nguyen
(74) *Attorney, Agent, or Firm* — troutman pepper locke; Tim Tingkang Xia, Esq.

(57) ABSTRACT

A heating apparatus, comprising a chamber body, a door body, a drawer, an electromagnetic wave generating system, and a slide rail assembly. The slide rail assembly comprises a fixed rail fixedly connected to the chamber body, and a slide portion capable of sliding along the fixed rail and fixedly connected to the drawer. The chamber body and the door body are each provided with an electromagnetic shielding feature. The slide portion is provided with at least one conductive connector. One end of each conductive connector is used to conductively connect to the electromagnetic shielding feature of the door body, and the other end is used to conductively connect to the fixed rail. Each conductive connector is fastened and conductively connected to the electromagnetic shielding feature of the door body by means of a fastener.

10 Claims, 7 Drawing Sheets

(56) References Cited

FOREIGN PATENT DOCUMENTS

| | | | | | | |
|---|---|---|---|---|---|---|
| CN | 112648775 | A | * | 4/2021 | ............... | A23B 2/82 |
| CN | 213486747 | U | | 6/2021 | | |
| EP | 3872431 | B1 | * | 10/2024 | ............... | A23B 2/82 |
| WO | WO-2020084862 | A1 | * | 4/2020 | ............... | A23B 2/82 |

* cited by examiner

HEATING APPARATUS

CROSS-REFERENCE TO RELATED PATENT APPLICATION

This application is a U.S. national stage application of PCT Patent Application No. PCT/CN2021/124863 filed Oct. 20, 2021, which claims priority to and the benefit of Chinese Application No. 202021750769.2 filed Aug. 20, 2020.

FIELD OF THE INVENTION

The present invention relates to the field of food processing, and particularly to an electromagnetic wave heating apparatus.

BACKGROUND OF THE INVENTION

In a food freezing process, the quality of food is maintained; however, the frozen food is required to be thawed before processing or consumption. In order to facilitate a user to freeze and thaw food, in the prior art, the food is generally thawed by means of an electromagnetic wave heating apparatus.

However, when the electromagnetic wave apparatus works, a high-voltage electromagnetic field is formed in a cavity thereof, which is prone to cause a safety hazard. In the prior art, a chamber body and a door body are provided with electromagnetic shielding features respectively, and the electromagnetic shielding feature of the chamber body and the electromagnetic shielding feature of the door body are directly connected conductively when the door body is closed, but due to factors, such as a processing technology, or the like, a small gap still exists between the chamber body and the door body when the door body is closed, and electromagnetic sealing cannot be realized. In view of the above, in design, it is desirable to provide an electromagnetic wave heating apparatus capable of effectively reducing or even preventing electromagnetic leakage.

BRIEF DESCRIPTION OF THE INVENTION

An object of the present invention is to overcome at least one of the technical drawbacks of the prior art and provide an electromagnetic wave heating apparatus.

A further object of the present invention is to improve the reliability of conductive connection.

Still another object of the present invention is to reduce noises generated by pushing and pulling a door body.

In particular, the present invention provides a heating apparatus, including:

a chamber body having a taking and placing opening;

a door body used to open and close the taking and placing opening;

a drawer configured to be fixedly connected with the door body and used to bear a to-be-processed object;

an electromagnetic wave generating system at least partially arranged in the chamber body or accessed into the chamber body, so as to generate electromagnetic waves in the chamber body to heat the to-be-processed object; and a slide rail assembly including a fixed rail fixedly connected to the chamber body, and a slide portion capable of sliding along the fixed rail and fixedly connected to the drawer;

wherein the chamber body and the door body are each provided with an electromagnetic shielding feature; and the slide portion is provided with at least one conductive connector, one end of each to conductive connector is used to conductively connect to the electromagnetic shielding feature of the door body, and the other end thereof is used to conductively connect to the fixed rail, thereby achieving conductive connection between the electromagnetic shielding feature of the door body and the electromagnetic shielding feature of the chamber body;

each conductive connector is fastened and conductively connected to the electromagnetic shielding feature of the door body by means of a fastener.

Optionally, the conductive connector includes:

a fixed part arranged on a side of the slide portion close to the fixed rail and fixedly connected with the slide portion; and a bent part configured to be bent and extend from the fixed part towards the fixed rail, and be fastened and conductively connected to the electromagnetic shielding feature of the door body by means of the fastener.

Optionally, the bent part is configured to extend from the fixed part towards the fixed rail and then extend forwards; and the fastener is configured to be fastened to the electromagnetic shielding feature of the door body, the bent part and the slide portion.

Optionally, the electromagnetic shielding feature of the door body includes:

a sheet metal member; and at least one sheet metal connector configured to be fastened to the sheet metal member, the at least one conductive connector being configured to be fastened and conductively connected to the at least one sheet metal connector by means of the fastener.

Optionally, the slide portion includes:

a body configured to be slidable along the fixed rail; and an end plate configured to extend from a front end of the body towards the fixed rail;

wherein a guide groove is formed in the end plate, and the sheet metal connector is configured to pass through the guide groove to be conductively connected with the conductive connector.

Optionally, the number of the slide rail assemblies, the number of the conductive connectors and the number of the sheet metal connectors are all two;

the two conductive connectors are arranged on two lateral sides of the drawer respectively, and each conductive connector is configured to be conductively connected with the fixed rail of one slide rail assembly.

Optionally, the conductive connector includes:

a fixed part arranged on a side of the slide portion close to the fixed rail and fixedly connected with the slide portion;

a connecting part configured to extend from the fixed part towards the fixed rail; and an elastic part configured to obliquely extend from a rear end of the connecting part towards the fixed rail and used to be conductively connected with the fixed rail.

Optionally, a conductive fixed member is arranged at a front part of the fixed rail; and the elastic part is configured to be slidable along the conductive fixed member and conductively connected with the conductive fixed member, and a gap is reserved between the elastic part and the fixed rail.

Optionally, the conductive connector further includes a guide part configured to obliquely extend from one end of the elastic part in a direction apart from the fixed rail; and/or each of a front end and a rear end of the conductive fixed member is provided with a flange obliquely extending in a direction apart from the conductive connector.

Optionally, the conductive fixed member includes:

a mounting part configured to be fixedly connected with the fixed rail; and a slide rail part configured to horizontally extend from an end of the mounting part close to the conductive connector;

wherein the conductive connector is configured to slide along the slide rail part; and a gap is reserved between the slide rail part and the fixed rail.

In the present invention, the conductive connector is arranged on the slide portion of the slide rail assembly, one end of the conductive connector can be kept in conductive connection with the electromagnetic shielding feature of the door body all the time, and the other end of the conductive connector is conductively connected with the electromagnetic shielding feature of the chamber body by means of the fixed rail of the slide rail assembly, such that the structure is stable and reliable, the processing difficulty and processing cost of the chamber body and the door body are reduced, and electromagnetic sealing between the door body and the chamber body is still maintained when the door body is opened by a certain distance, thereby improving the reliability of the electromagnetic shielding. Further, in the present invention, the conductive connector is fastened and conductively connected to the electromagnetic shielding feature of the door body by means of the fastener, thus further improving the reliability of the electromagnetic shielding.

Further, in the present invention, the bent part extends from the fixed part towards the fixed rail and then extends forwards, and the fastener is simultaneously fastened to the electromagnetic shielding feature of the door body, the bent part and the slide portion, such that the conductive connector is fixed to the slide portion by means of the fixed part, the front part of the bent part and the fastener, thus further improving the stability of the conductive connector, and avoiding that the conductive connector is not conductively connected with the conductive fixed member due to deformation.

Further, in the present invention, the conductive fixed member is arranged at the front part of the fixed rail, a second elastic part slides along the slide rail part of the conductive fixed member, the gap is reserved between the slide rail part and the fixed rail, the slide portion can slide more smoothly utilizing the elasticity of the slide rail part, and the conductive connection between the second elastic part and the slide rail part is more reliable, thus further improving the electromagnetic sealing performance of the heating apparatus, reducing the process difficulty of the fixed rail, and reducing the noise generated by pushing and pulling the door body.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1:
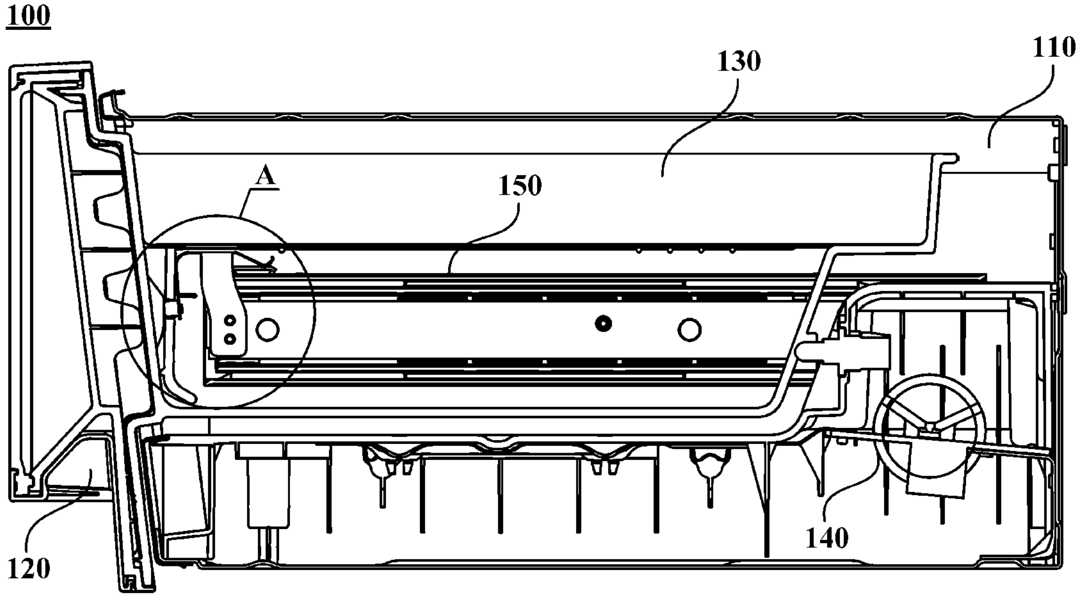
FIG. 1 is a schematic sectional diagram of a heating apparatus according to an embodiment of the present invention.

FIG. 1 is a schematic sectional diagram of a heating apparatus 100 according to an embodiment of the present invention. Referring to FIG. 1, the heating apparatus 100 may include a chamber body 110 having a taking and placing opening, a door body 120 used to open and close the taking and placing opening, an electromagnetic wave generating system 140, a drawer 130, and a slide rail assembly 150.

The drawer 130 may be configured to be fixedly connected with the door body 120 and used to bear a to-be-processed object. The slide rail assembly 150 may include a fixed rail 151 fixedly connected to the chamber body 110, and a slide portion capable of sliding along the fixed rail 151 and fixedly connected to the drawer 130 to facilitate the taking and placing of the to-be-processed object.

The electromagnetic wave generating system 140 may be at least partially arranged in the chamber body 110 or accessed into the chamber body 110, so as to generate electromagnetic waves in the chamber body 110 to heat the to-be-processed object.

The electromagnetic wave generating system 140 may include an electromagnetic wave generating module, a power supply module, a radiation antenna, and a signal processing, measurement and control circuit.

The power supply module may be configured to be electrically connected to the electromagnetic wave generating module and arranged outside the chamber body 110 to provide electric energy for the electromagnetic wave generating module, such that the electromagnetic wave generating module generates an electromagnetic wave signal.

The radiation antenna may be arranged in the chamber body 110 and electrically connected to the electromagnetic wave generating module, so as to generate an electromagnetic wave with a corresponding frequency according to the electromagnetic wave signal to heat the to-be-processed object in the chamber body 110.

The chamber body 110 and the door body 120 may be provided with electromagnetic shielding features respectively, which are configured to at least conductively connect the door body 120 with the chamber body 110 when the door body is in a closed state, so as to prevent electromagnetic leakage.

In some embodiments, the chamber body 110 may be made of metal; that is, the chamber body 110 itself is its electromagnetic shielding feature. The chamber body 110 may also be made of other materials and its electromagnetic shielding feature may be a metal coating or a metal mesh.

Figure 2:
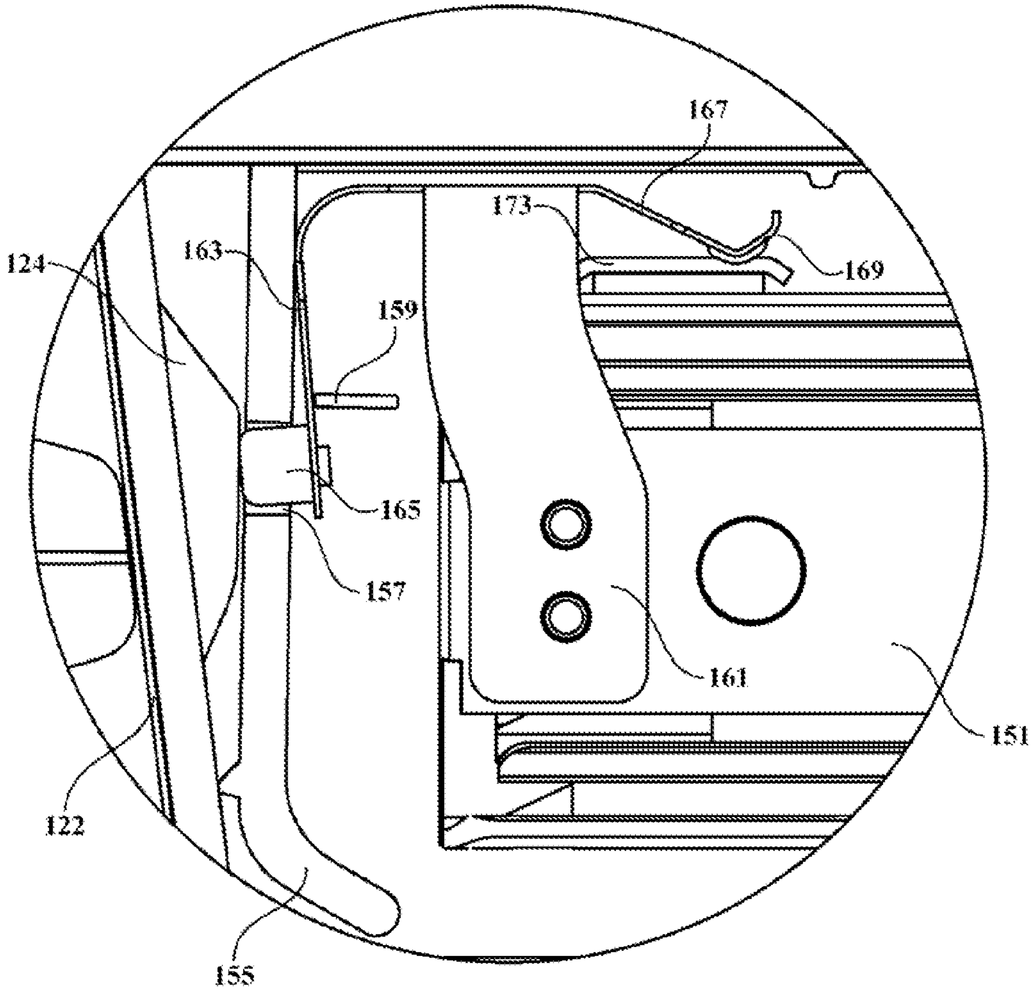
FIG. 2 is a schematic enlarged diagram of region A in FIG. 1.
Figure 4:
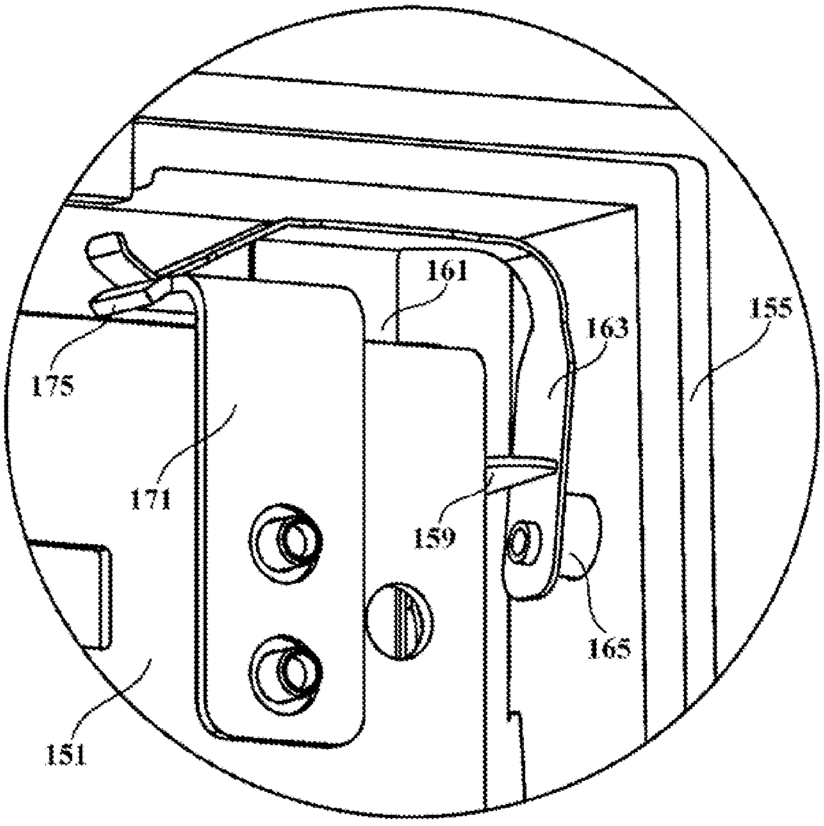
FIG. 4 is a schematic enlarged diagram of region B in FIG. 3.
Figure 5:
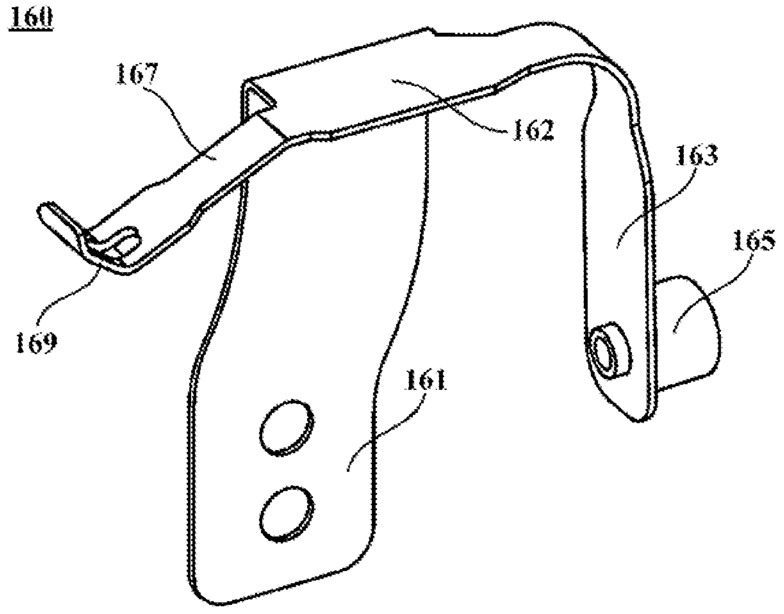
FIG. 5 is a schematic isometric diagram of a conductive connector of FIG. 4.

FIG. 2 is a schematic enlarged diagram of region A in FIG. 1, and FIG. 5 is a schematic isometric diagram of a conductive connector 160 of FIG. 4. Referring to FIGS. 2 and 5, in particular, the slide portion may be provided with at least one conductive connector 160.

One end of the conductive connector 160 may be used to conductively connect to the electromagnetic shielding feature of the door body 120, and the other end thereof may be used to conductively connect to the fixed rail 151, thereby achieving conductive connection between the electromagnetic shielding feature of the door body 120 and the electromagnetic shielding feature of the chamber body 110. In the present invention, the term “at least one” means one, two, or more than two.

In the present invention, the conductive connector 160 is arranged on the slide portion of the slide rail assembly 150, one end of the conductive connector can be kept in conductive connection with the electromagnetic shielding feature of the door body 120 all the time, and the other end of the conductive connector is conductively connected with the electromagnetic shielding feature of the chamber body 110 by means of the fixed rail 151 of the slide rail assembly 150, such that the structure is stable and reliable, the processing difficulty and processing cost of the chamber body 110 and the door body 120 are reduced, and electromagnetic sealing between the door body 120 and the chamber body 110 is still maintained when the door body 120 is opened by a certain distance, thereby improving the reliability of the electromagnetic shielding.

In some embodiments, the conductive connector 160 may include a fixed part 161, a connecting part 162, a first elastic part 163, and a protrusion 165.

Specifically, the fixed part 161 may be arranged on a side of the slide portion close to the fixed rail 151, and fixedly connected with the slide portion.

The connecting part 162 may be configured to extend from the fixed part 161 towards the fixed rail 151.

The first elastic part 163 may be configured to extend obliquely from a front end of the connecting part 162; that is, an included angle is formed between the first elastic part 163 and the connecting part 162.

The protrusion 165 may be arranged at an end of the first elastic part 163 apart from the connecting part 162 and protrude forwards. The protrusion 165 is configured to be conductively connected to the electromagnetic shielding feature of the door body 120 to facilitate assembly, and the elasticity of the first elastic part 163 is utilized to keep the protrusion 165 in close conductive connection with the electromagnetic shielding feature of the door body 120, such that the door body 120 and the drawer 130 can be conveniently assembled and disassembled while the structure is stable and reliable.

In some further embodiments, the slide portion may include a body 153 slidable along the fixed rail 151, and an end plate 155 extending from a front end of the body 153 towards the fixed rail 151.

The end plate 155 may be provided with a limiting hole 157. The protrusion 165 may be configured to pass through the limiting hole 157 to be conductively connected with the electromagnetic shielding feature of the door body 120, so as to limit the moving direction of the protrusion 165 and prevent the protrusion 165 from being separated from the electromagnetic shielding feature of the door body 120.

The slide portion may further include a stopper 159 located on a rear side of the end plate 155. The stopper 159 is configured to extend from the body 153 towards the fixed rail 151 and used to limit rearward movement of the protrusion 165 to prevent the protrusion 165 from being separated from the limiting hole 157 during assembly and use.

The distance between the stopper 159 and the end plate 155 may be less than the axial size of the protrusion 165 to prevent a front end portion of the protrusion 165 from being fully located within the limiting hole 157.

In some further embodiments, the first elastic part 163 may be configured to obliquely extend forwards in a natural state (not stressed) to make the fixation of the conductive connector 160 and the slide portion more reliable, thus further preventing the protrusion 165 from being separated from the electromagnetic shielding feature of the door body 120. The included angle between the first elastic part 163 and the connecting part 162 may be 80° to 88°. In some other embodiments, the first elastic part 163 may also be perpendicular to the connecting part 162.

In some embodiments, the electromagnetic shielding feature of the door body 120 is a sheet metal member 122. The sheet metal member 122 may be provided with at least one boss 124 protruding backwards and used to be conductively connected with the at least one conductive connector 160 respectively, so as to realize reliable connection between the sheet metal member 122 and the conductive connector 160, and reduce the process difficulty of the door body 120.

A forward side plate of the drawer 130 may be configured to close the taking and placing opening of the chamber body 110 when the door body 120 is in the closed state, and the boss 124 may be configured to pass through the forward side plate to be conductively connected with the conductive connector 160.

Figure 3:
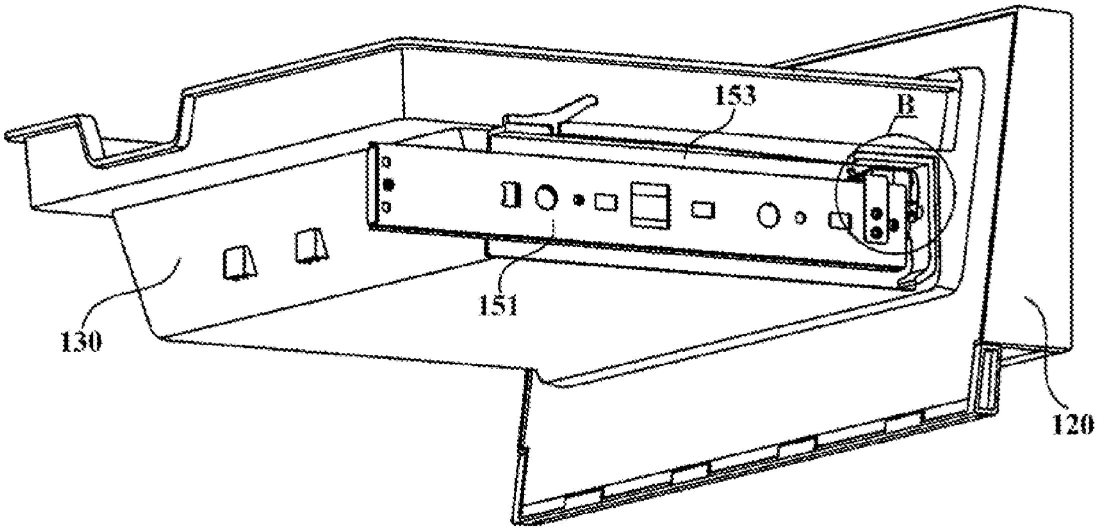
FIG. 3 is a schematic isometric diagram of a door body, a drawer and a slide rail assembly of FIG. 1 viewed from rear to front.
Figure 6:
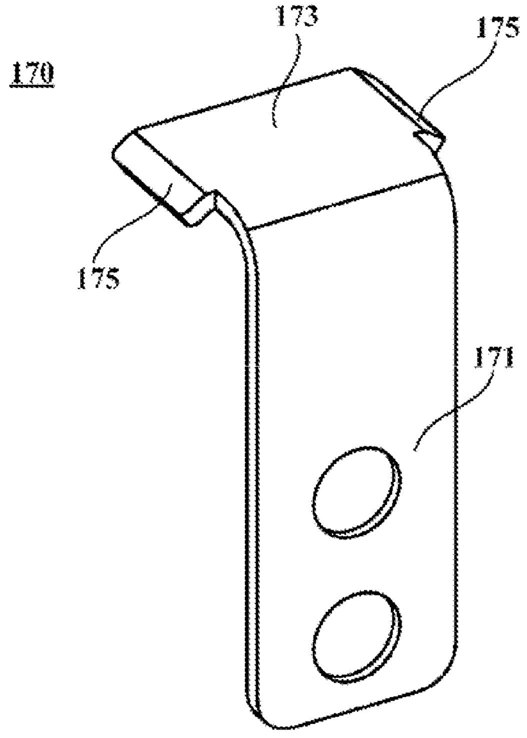
FIG. 6 is a schematic isometric diagram of a conductive fixed member of FIG. 4.

FIG. 3 is a schematic isometric diagram of the door body 120, the drawer 130 and the slide rail assembly 150 of FIG. 1 viewed from rear to front; FIG. 4 is a schematic enlarged diagram of region B in FIG. 3; FIG. 6 is a schematic isometric diagram of a conductive fixed member 170 of FIG. 4. Referring to FIGS. 3 to 6, the conductive connector 160 may further include a second elastic part 167 extending obliquely from a rear end of the connecting part 162 towards the fixed rail 151 and used to be conductively connected with the fixed rail 151.

The conductive fixed member 170 may be arranged at a front part of the fixed rail 151. The second elastic part 167 may be configured to be slidable along the conductive fixed member 170 and conductively connected with the conductive fixed member 170, and a gap is reserved between the second elastic part 167 and the fixed rail 151. That is, the second elastic part 167 only slides along the conductive fixed member 170, and does not rub against the fixed rail 151, thereby reducing the process difficulty of the fixed rail 151.

In some further embodiments, the conductive connector 160 may further include a guide part 169 configured to extend obliquely from one end of the second elastic part 167 in a direction apart from the fixed rail 151, such that the slide portion slides more smoothly to avoid collision noises.

Each of a front end and a rear end of the conductive fixed member 170 may be provided with a flange 175 obliquely extending in a direction apart from the conductive connector 160, such that the slide portion slides more smoothly to avoid the collision noises.

In some further embodiments, the conductive fixed member 170 may include a mounting part 171 fixedly connected to the fixed rail 151 and a slide rail part 173 horizontally extending from an end of the mounting part 171 close to the conductive connector 160. The flange 175 may be arranged on the slide rail part 173, and the conductive connector 160 may be configured to slide along the slide rail part 173.

A gap may be reserved between the slide rail part 173 and the fixed rail 151, such that the slide portion slides more smoothly by the elasticity of the slide rail part 173, and the conductive connection between the second elastic part 167 and the slide rail part 173 is more reliable.

In some other embodiments, the second elastic part 167 can be directly conductively connected to the fixed rail 151, so as to realize effective conductive connection between the electromagnetic shielding feature of the door body 120 and the electromagnetic shielding feature of the chamber body 110 in both the closed state and an open state of the door body 120.

Figure 7:
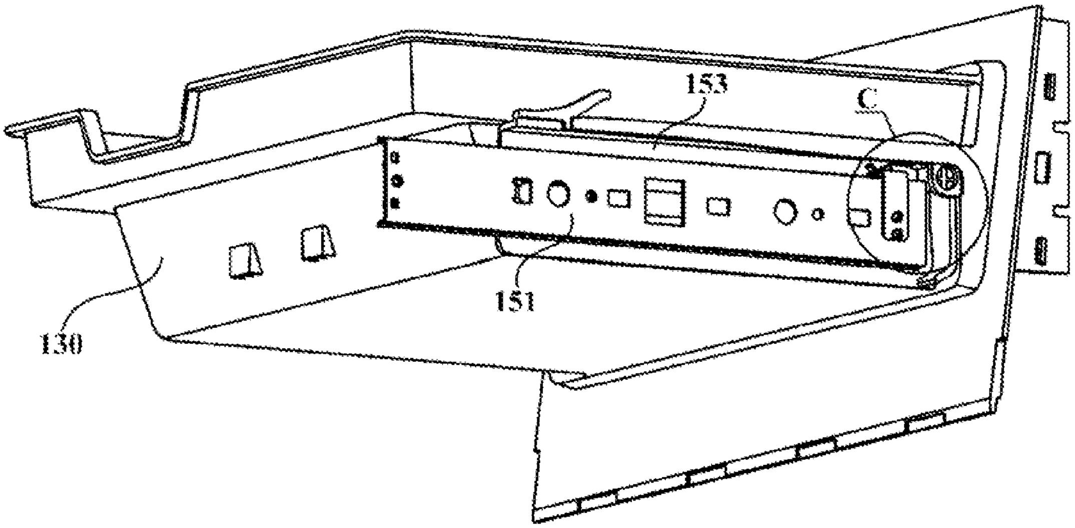
FIG. 7 is a schematic isometric diagram of a drawer and a slide rail assembly in another embodiment of the present invention.
Figure 8:
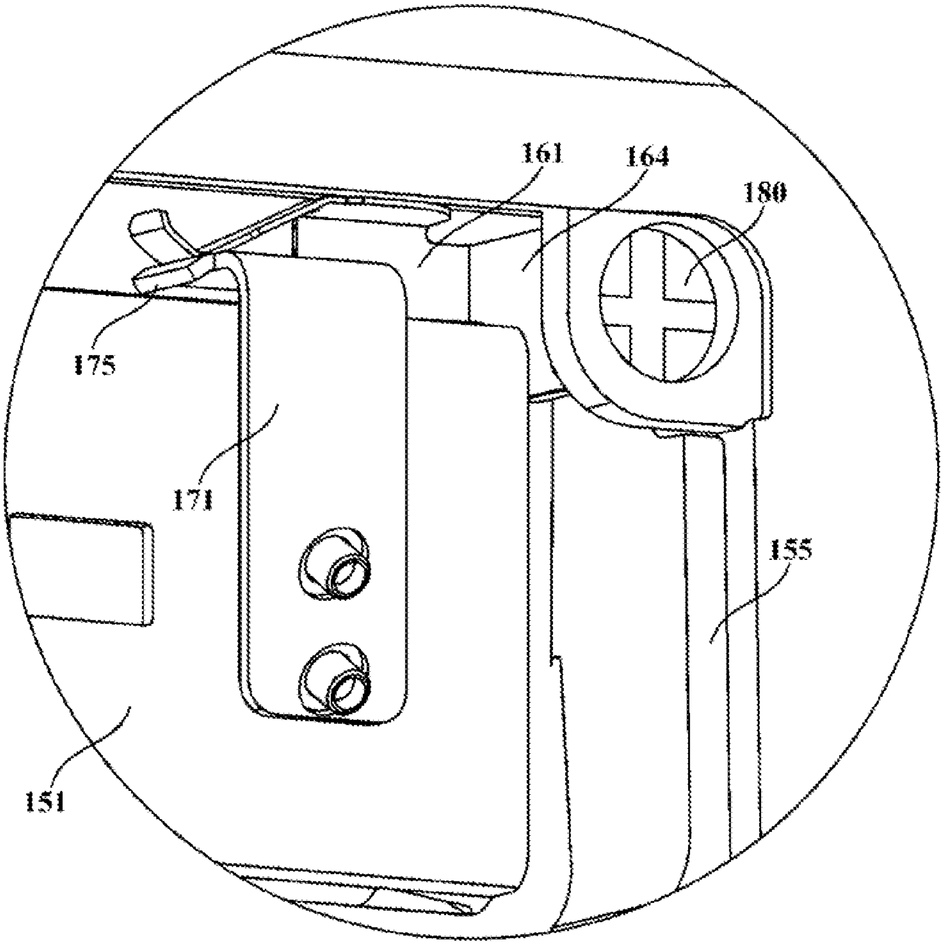
FIG. 8 is a schematic enlarged diagram of region C in FIG. 7.
Figure 9:
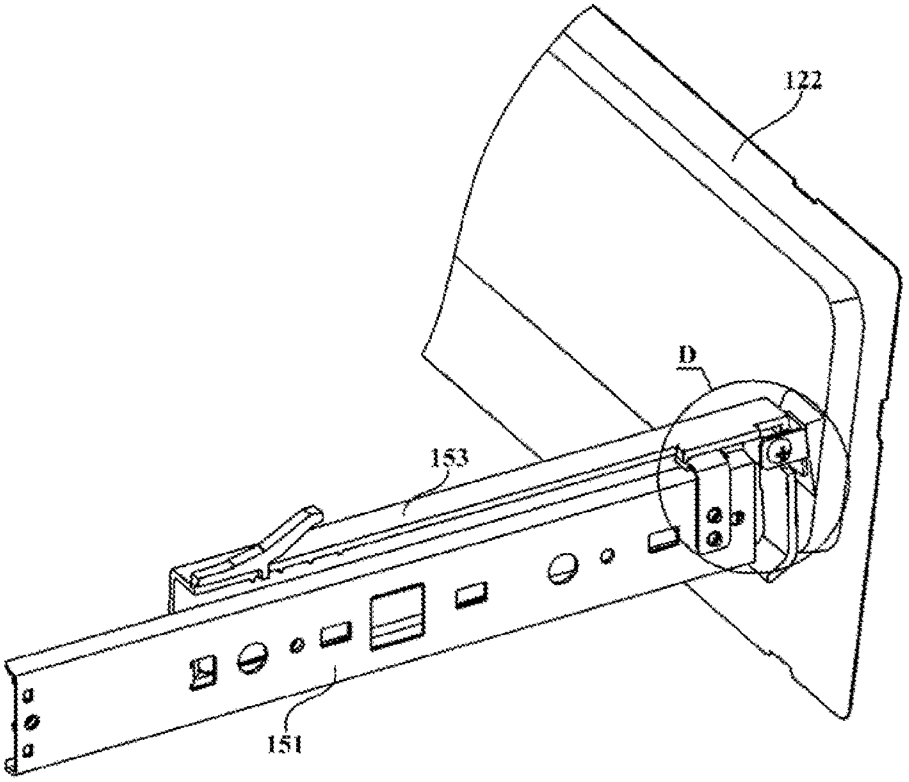
FIG. 9 is a schematic isometric diagram of a sheet metal member and the slide rail assembly of FIG. 7 viewed from another angle.
Figure 10:
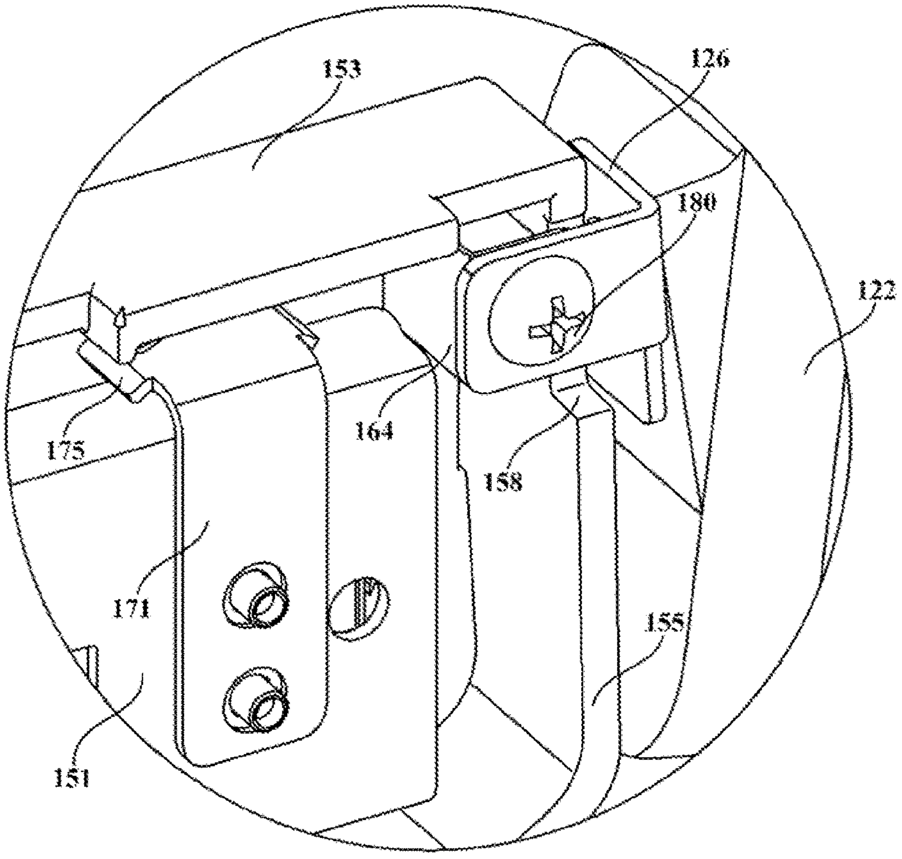
FIG. 10 is a schematic enlarged diagram of region D in FIG. 9.
Figure 11:
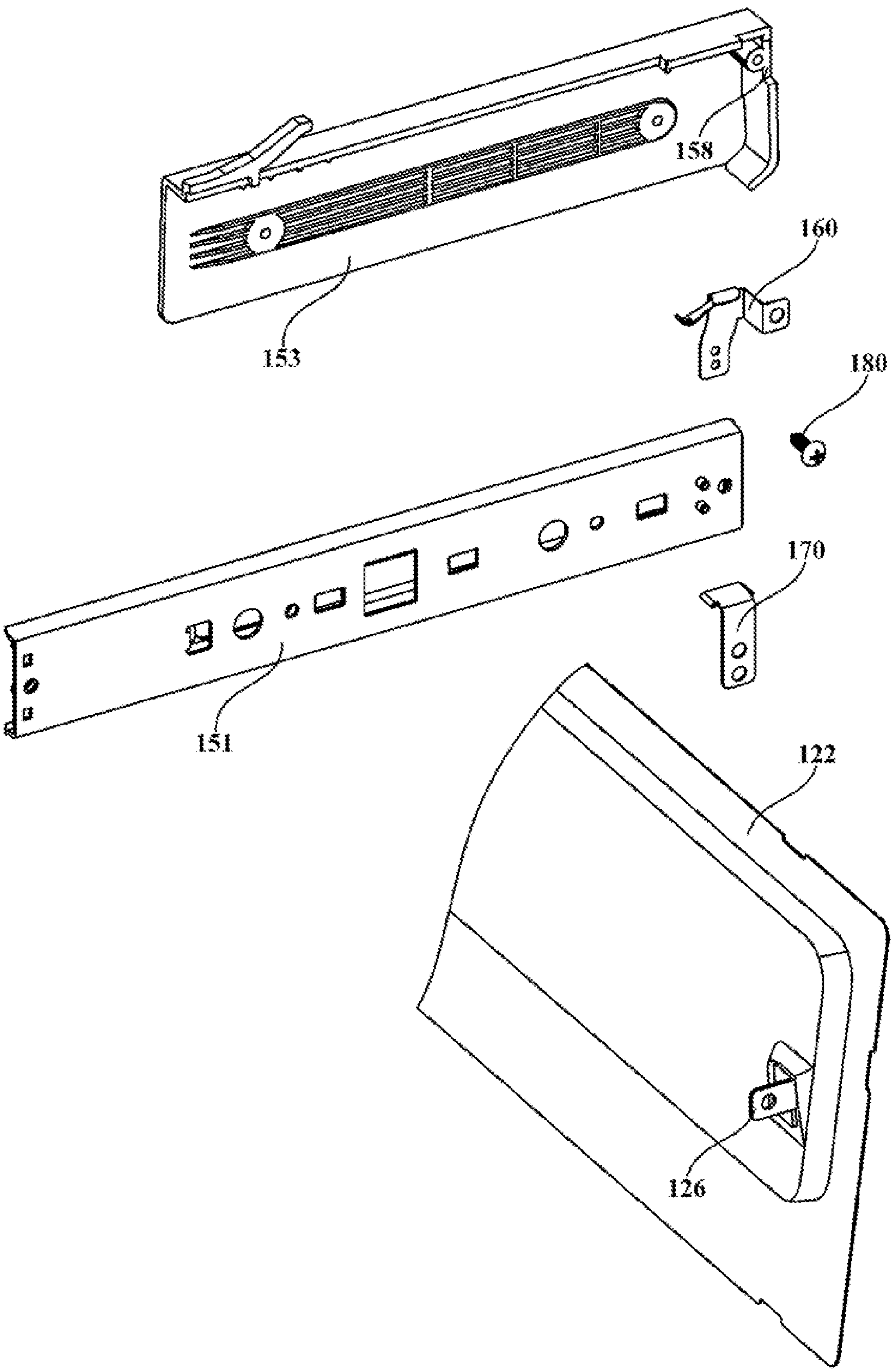
FIG. 11 is a schematic exploded diagram of the sheet metal member and the slide rail assembly shown in FIG. 9.
Figure 12:
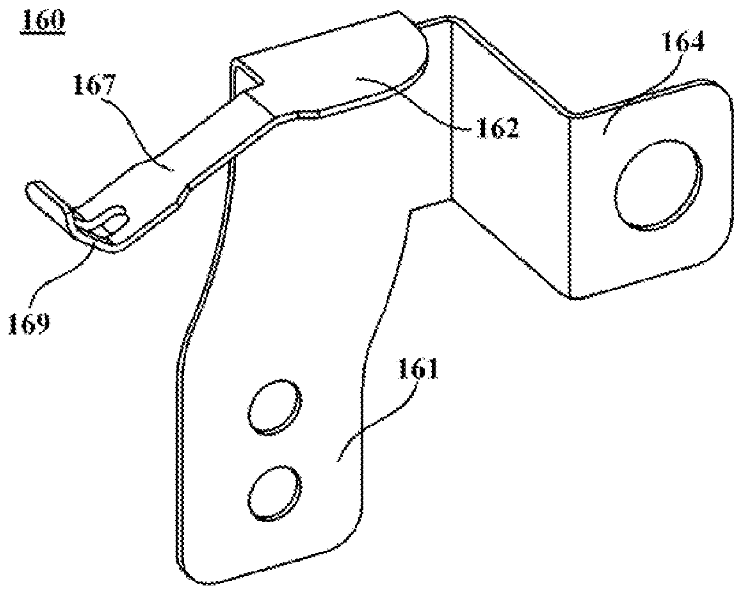
FIG. 12 is a schematic isometric diagram of a conductive connector of FIG. 11.

FIG. 7 is a schematic isometric diagram of a drawer and a slide rail assembly in another embodiment of the present invention; FIG. 8 is a schematic enlarged diagram of region C in FIG. 7; FIG. 9 is a schematic isometric diagram of a sheet metal member and the slide rail assembly of FIG. 7 viewed from another angle; FIG. 10 is a schematic enlarged diagram of region D in FIG. 9; FIG. 11 is a schematic exploded diagram of the sheet metal member and the slide rail assembly shown in FIG. 9; FIG. 12 is a schematic isometric diagram of a conductive connector of FIG. 11. Referring to FIGS. 7 to 12, the present invention further provides another connection structure of the electromagnetic shielding features, and only the differences from the previous connection structure of the electromagnetic shielding features will be described below.

The conductive connector 160 may be fastened and conductively connected to the electromagnetic shielding feature of the door body 120 by means of a fastener 180, so as to improve the reliability of electromagnetic shielding.

The conductive connector 160 may include a fixed part 161, a connecting part 162, a bent part 164, an elastic part 167, and a guide part 169. The bent part 164 may be configured to be bent and extend from the fixed part 161 towards the fixed rail 151, and be fastened and conductively connected to the electromagnetic shielding feature of the door body 120 by means of the fastener 180, so as to improve structural compactness and facilitate assembly.

In some further embodiments, the bent part 164 may be configured to extend from the fixed part 161 towards the fixed rail 151 and then extend forwards. The fastener 180 may be configured to be fastened to the electromagnetic shielding feature of the door body 120, the bent part 164 and the slide portion. That is, the conductive connector 160 is fixed to the slide portion by means of the fixed part 161, the front part of the bent part 164 and the fastener 180, so as to further improve the stability of the conductive connector 160.

In some further embodiments, the electromagnetic shielding features of the door body 120 may include at least one sheet metal connector 126 in addition to the sheet metal member 122. The sheet metal connector 126 may be configured to be fastened to the sheet metal member 122, and the at least one conductive connector 160 may be configured to be fastened and conductively connected to the at least one sheet metal connector 126 by means of the fastener 180, so as to facilitate the production and processing of the sheet metal member 122.

A guide groove 158 may be formed in the end plate 155, and the sheet metal connector 126 may be configured to pass through the guide groove 158 to be conductively connected with the conductive connector 160, so as to guide the connection between the sheet metal connector 126 and the conductive connector 160 and improve an assembly efficiency, which is particularly suitable for the situation where the number of the conductive connectors 160 is multiple.

In the present invention, the number of the slide rail assemblies 150, the number of the conductive connectors 160 and the number of the sheet metal connectors 126 may all be two, the two conductive connectors 160 may be arranged on two lateral sides of the drawer 130 respectively, and each conductive connector 160 may be configured to be conductively connected with the fixed rail 151 of one slide rail assembly 150, and directly conductively connected to the sheet metal member 122 or one sheet metal connector 126, so as to improve the electromagnetic shielding effect.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A heating apparatus, configured to heat a to-be-processed object with electromagnetic waves and comprising:

a chamber body having a taking and placing opening;

a door body used to open and close the taking and placing opening;

a drawer configured to be fixedly connected with the door body and used to bear the to-be-processed object; and a slide rail assembly comprising a fixed rail fixedly connected to the chamber body, and a slide portion capable of sliding along the fixed rail and fixedly connected to the drawer;

wherein the chamber body and the door body are each provided with an electromagnetic shielding feature; and the slide portion is provided with at least one conductive connector, one end of each conductive connector is used to conductively connect to the electromagnetic shielding feature of the door body, and the other end thereof is used to conductively connect to the fixed rail, thereby achieving conductive connection between the electromagnetic shielding feature of the door body and the electromagnetic shielding feature of the chamber body;

each conductive connector is fastened and conductively connected to the electromagnetic shielding feature of the door body by means of a fastener.

2. The heating apparatus according to claim 1, wherein each of the at least one conductive connector comprises:

a fixed part arranged on a side of the slide portion close to the fixed rail and fixedly connected with the slide portion; and a bent part configured to be bent and extend from the fixed part towards the fixed rail, and be fastened and conductively connected to the electromagnetic shielding feature of the door body by means of one of the fasteners.

3. The heating apparatus according to claim 2, wherein the bent part is configured to extend from the fixed part towards the fixed rail and then extend forwards; and each fastener is configured to be fastened to the electromagnetic shielding feature of the door body, the bent part and the slide portion.

4. The heating apparatus according to claim 1, wherein the electromagnetic shielding feature of the door body comprises:

a sheet metal member; and at least one sheet metal connector configured to be fastened to the sheet metal member, the at least one conductive connector being configured to be fastened and conductively connected to the at least one sheet metal connector by means of the fasteners.

5. The heating apparatus according to claim 4, wherein the slide portion comprises:

a body configured to be slidable along the fixed rail; and an end plate configured to extend from a front end of the body towards the fixed rail;

wherein a guide groove is formed in the end plate, and the at least one sheet metal connector is configured to pass through the guide groove to be conductively connected with the at least one conductive connector.

6. The heating apparatus according to claim 4, wherein the number of the slide rail assemblies, the number of the conductive connectors and the number of the sheet metal connectors are all two;

the two conductive connectors are arranged on two lateral sides of the drawer respectively, and one of the two conductive connectors is configured to be conductively connected with the fixed rail of one of the two slide rail assemblies while the other of the two conductive connectors is configured to be conductively connected with the fixed rail of the other of the two slide rail assemblies.

7. The heating apparatus according to claim 1, wherein each of the at least one conductive connector comprises:

a fixed part arranged on a side of the slide portion close to the fixed rail and fixedly connected with the slide portion;

a connecting part configured to extend from the fixed part towards the fixed rail; and an elastic part configured to obliquely extend from a rear end of the connecting part towards the fixed rail and used to be conductively connected with the fixed rail.

8. The heating apparatus according to claim 7, wherein a conductive fixed member is arranged at a front part of the fixed rail; and the elastic part is configured to be slidable along the conductive fixed member and conductively connected with the conductive fixed member, and a gap is reserved between the elastic part and the fixed rail.

9. The heating apparatus according to claim 8, wherein each of the at least one conductive connector further comprises a guide part configured to obliquely extend from one end of the elastic part in a direction apart from the fixed rail; and/or each of a front end and a rear end of the conductive fixed member is provided with a flange obliquely extending in a direction apart from the elastic part.

10. The heating apparatus according to claim 8, wherein the conductive fixed member comprises:

a mounting part configured to be fixedly connected with the fixed rail; and a slide rail part configured to horizontally extend from an end of the mounting part close to the at least one conductive connector;

wherein the at least one conductive connector is configured to slide along the slide rail part; and a gap is reserved between the slide rail part and the fixed rail.

* * * * *